United States Patent
Lee et al.

(10) Patent No.: US 10,337,390 B2
(45) Date of Patent: Jul. 2, 2019

(54) SYSTEM AND METHOD FOR CHARGING PLUG-IN HYBRID VEHICLE

(71) Applicants: Hyundai Motor Company, Seoul (KR); Kia Motors Corporation, Seoul (KR)

(72) Inventors: Jang Hyo Lee, Gyeonggi-do (KR); Kyu Jin Lee, Seoul (KR); Sang Hoon Yoo, Incheon (KR); Chun Hyuk Lee, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 213 days.

(21) Appl. No.: 15/278,287

(22) Filed: Sep. 28, 2016

(65) Prior Publication Data
US 2017/0347500 A1 Nov. 30, 2017

(30) Foreign Application Priority Data
May 26, 2016 (KR) .................. 10-2016-0065078

(51) Int. Cl.
| | |
|---|---|
| G05D 23/00 | (2006.01) |
| F01P 5/02 | (2006.01) |
| F01P 3/20 | (2006.01) |
| F01P 7/16 | (2006.01) |
| H02J 7/00 | (2006.01) |
| H01M 10/48 | (2006.01) |
| B60L 53/14 | (2019.01) |

(52) U.S. Cl.
CPC .............. *F01P 5/02* (2013.01); *F01P 3/20* (2013.01); *F01P 7/164* (2013.01); *H02J 7/0029* (2013.01);
(Continued)

(58) Field of Classification Search
CPC ....... B60L 3/00; F01P 7/164; F01P 2007/168; H01M 2220/20
(Continued)

(56) References Cited

U.S. PATENT DOCUMENTS 5,937,664 A * 8/1999 Matsuno ............ B60H 1/00278
                                                              62/259.2
7,755,329 B2 * 7/2010 Kohn ..................... H02J 7/0091
                                                              320/150
(Continued)

FOREIGN PATENT DOCUMENTS

| JP | 2011-091946 A | 5/2011 |
| JP | 2011091946 A * | 5/2011 |

(Continued)

OTHER PUBLICATIONS

Translation of JP 2011091946 A entitled Translation-JP 2011091946 A.*

*Primary Examiner* — Paul Alvare
(74) *Attorney, Agent, or Firm* — Mintz Levin Cohn Ferris Glovsky and Popeo, P.C.; Peter F. Corless

(57) ABSTRACT

A system and method for charging a plug-in hybrid vehicle can improve the on-board charging efficiency of the plug-in hybrid vehicle by adjusting a frequency of operation of a cooler when cooling an on-board charger (OBC) by circulating coolant when the temperature of the OBC rises while a high-voltage battery is being charged. The operations of a water pump and a radiator fan are controlled by determining whether the voltage of the high-voltage battery is within or out of a reference voltage range in which the on-board charging of the high-voltage battery is performed. This consequently prevents power from being unnecessarily consumed by operation of the cooler, such that the efficiency of charging is improved and the OBC is properly cooled.

7 Claims, 5 Drawing Sheets

(52) U.S. Cl.
CPC .............. *B60L 53/14* (2019.02); *H01M 10/48* (2013.01); *H01M 2220/20* (2013.01); *H02J 7/00* (2013.01)

(58) Field of Classification Search
USPC ........................................................ 165/287
See application file for complete search history.

(56) References Cited

U.S. PATENT DOCUMENTS

| | | | | |
|---|---|---|---|---|
| 2007/0152640 | A1* | 7/2007 | Sasaki | B60H 1/00278 320/150 |
| 2009/0143929 | A1* | 6/2009 | Eberhard | H02J 7/045 701/22 |
| 2013/0030622 | A1* | 1/2013 | Park | B60K 6/46 701/22 |
| 2014/0012447 | A1* | 1/2014 | Gao | B60L 11/1874 701/22 |
| 2017/0305292 | A1* | 10/2017 | Minamiura | B60L 3/0046 |

FOREIGN PATENT DOCUMENTS

| | | |
|---|---|---|
| JP | 2015-159625 A | 9/2015 |
| KR | 2009-0092041 A | 8/2009 |
| KR | 10-2010-0035772 A | 4/2010 |
| KR | 2013-0017725 A | 2/2013 |
| KR | 10-2013-0042137 A | 4/2013 |
| KR | 10-1427969 B1 | 8/2014 |
| KR | 2015-0059246 A | 6/2015 |

\* cited by examiner

SYSTEM AND METHOD FOR CHARGING PLUG-IN HYBRID VEHICLE

CROSS REFERENCE TO RELATED APPLICATION

The present application claims under 35 U.S.C. § 119(a) the benefit of Korean Patent Application No. 10-2016-0065078, filed May 26, 2016, the entire contents of which are incorporated by reference herein.

BACKGROUND

1. Technical Field

The present invention relates generally to a system and method for charging a plug-in hybrid vehicle, the system and method being configured to improve the on-board charging efficiency of a plug-in hybrid vehicle.

2. Description of the Related Art

An on-board charger (OBC) is disposed in a vehicle such as an electric vehicle or a plug-in hybrid vehicle using electricity as a main power source to charge a battery of the vehicle using 110V or 220V electricity.

The OBC generates a large amount of heat while charging the battery of the vehicle with electricity. Such heat may have a significant adverse effect on the lifespan of the battery as well as the performance and lifespan of the OBC unless controlled. Thus, coolant is supplied to the OBC to control heat generated during charging to ensure that the temperature of the OBC is within a predetermined range.

When the temperature of the OBC rises during the charging of the battery as described above, the coolant is circulated to cool the OBC. The coolant is circulated as the temperature of the OBC rises shortly after the start of charging of the battery. When the temperature of the OBC rises, a cooling system circulates an excessive amount of coolant toward the OBC. Thus, power consumed by the cooling system lowers the efficiency of charging.

In the related art, during the charging of the battery, the cooling of the OBC is performed considering the efficiency of charging as influenced by the cooling of the OBC, thereby inefficiently consuming power. Thus, there are demands for minimizing the amount of power consumed by the operation of the cooling system.

The foregoing is intended merely to aid in the understanding of the background of the present invention, and is not intended to mean that the present invention falls within the purview of the related art that is already known to those skilled in the art.

SUMMARY

Accordingly, the present invention provides a system and method for charging a plug-in hybrid vehicle, the charging system and method being configured to improve the on-board charging efficiency of a plug-in hybrid vehicle by adjusting the frequency of operation of a cooler when cooling an on-board charger (OBC) by circulating coolant when the temperature of the OBC rises while a battery is being charged.

In order to achieve the above object, according to one aspect of the present invention, a system for charging a plug-in hybrid vehicle may include: a cooler configured to cool an OBC by circulating coolant therethrough, the OBC charging a high-voltage battery of a vehicle; and a controller having voltage information of the high-voltage battery input thereto and a reference voltage range previously stored therein, wherein when a voltage of the high-voltage battery is within the reference voltage range, the controller decreases a frequency of operation and an intensity of cooling of the cooler, and when the voltage of the high-voltage battery is out of the reference voltage range, the controller increases the frequency of operation and the intensity of cooling of the cooler.

The cooler may include a water pump configured to cause a cooling medium to circulate when the OBC is required to be cooled.

When the voltage of the high-voltage battery is lower than the reference voltage range, the controller may control the water pump to operate when a temperature of the OBC has reached an operating temperature range that is previously-stored.

When the voltage of the high-voltage battery is within the reference voltage range, the controller may control the water pump to operate in a corrected temperature range higher than the operating temperature range.

When the voltage of the high-voltage battery is lower than the reference voltage range, the controller may control the water pump to operate at an operating speed that is previously stored.

When the voltage of the high-voltage battery is within the reference voltage range, the controller may control the water pump to operate in a corrected temperature range lower than the operating temperature range.

The cooler may include a radiator fan configured to adjust a temperature of a cooling medium that circulates to cool the OBC.

When the voltage of the high-voltage battery is lower than the reference voltage range, the controller may control the radiator fan to operate when a temperature of the OBC has reached an operating temperature range that is previously stored.

When the voltage of the high-voltage battery is within the reference voltage range, the controller may control the radiator fan to operate in a corrected temperature range higher than the operating temperature range.

The controller may control the radiator fan to operate at a higher intensity of operation with increases in temperature in the operating temperature range or the corrected temperature range.

According to one aspect of the present invention, a method of charging a plug-in vehicle may include: measuring, by a controller, a voltage of a high-voltage battery; increasing, by the controller, a frequency of operation and an intensity of cooling of a cooler when the voltage of the high-voltage battery is out of a reference voltage range that is previously stored after measuring the voltage of the high-voltage battery; and reducing, by the controller, the frequency of operation and the intensity of cooling of the cooler when the voltage of the high-voltage battery is within the reference voltage range that is previously stored after measuring the voltage of the high-voltage battery.

The cooler may include a water pump configured to cause a cooling medium to circulate when an OBC is required to be cooled and a radiator fan configured to adjust a temperature of the cooling medium that circulates to cool the OBC. In the step of increasing the frequency of operation and the intensity of cooling and reducing the frequency of operation and the intensity of cooling, an operating temperature range and an intensity of operation of the water pump and the radiator fan may vary depending on the voltage of the high-voltage battery.

In the step of increasing the frequency of operation and the intensity of cooling, when the voltage of the high-voltage battery is lower than the reference voltage range, the water pump may be controlled to operate at an operating speed that is previously stored when a temperature of the OBC has reached the operating speed.

In the step of reducing the frequency of operation and the intensity of cooling, when the voltage of the high-voltage battery is within the reference voltage range, the water pump may be controlled to operate in a corrected temperature range higher than the operating temperature range when a temperature of the OBC has reached the operating speed.

In the step of increasing the frequency of operation and the intensity of cooling, when the voltage of the high-voltage battery is lower than the reference voltage range, the radiator fan may be controlled to operate when a temperature of the OBC has reached the operating temperature range.

In the step of reducing the frequency of operation and the intensity of cooling, when the voltage of the high-voltage battery is within the reference voltage range, the radiator fan may be controlled to operate in a corrected temperature range higher than the operating temperature range.

A non-transitory computer readable medium containing program instructions executed by a processor includes: program instructions that measure a voltage of a high-voltage battery; program instructions that increase a frequency of operation and an intensity of cooling of a cooler when the voltage of the high-voltage battery is out of a reference voltage range that is previously stored after measuring the voltage of the high-voltage battery; and program instructions that reduce the frequency of operation and the intensity of cooling of the cooler when the voltage of the high-voltage battery is within the reference voltage range that is previously stored after measuring the voltage of the high-voltage battery.

According to the system and method for charging a plug-in hybrid vehicle as described above, it is possible to improve the on-board charging efficiency of a plug-in hybrid vehicle by adjusting the frequency of operation of a cooler when cooling an OBC by circulating coolant when the temperature of the OBC rises while a battery is being charged.

The operation of the water pump and the operation of the radiator fan are controlled by determining whether the voltage of the high-voltage battery is within or out of a reference voltage range in which the high-voltage battery is charged using the OBC. This prevents power from being unnecessarily consumed by the operation of the cooler, thereby improving the efficiency of charging and facilitating the cooling of the OBC.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
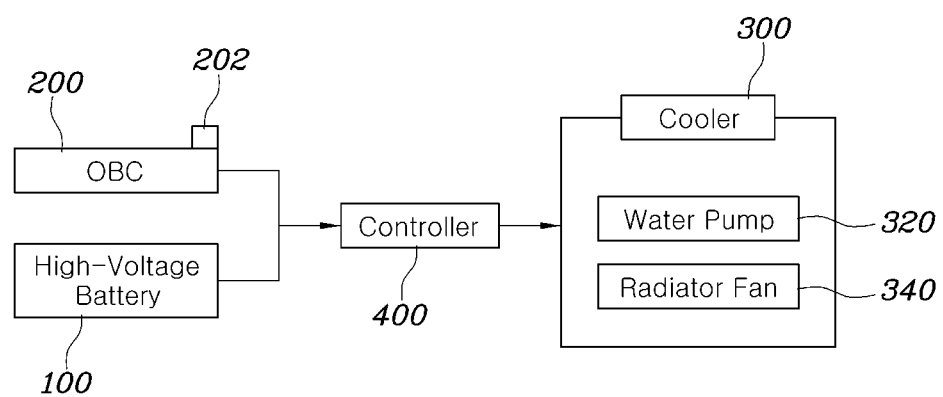
FIG. 1 is a block diagram of a configuration of a system for charging a plug-in hybrid vehicle according to an exemplary embodiment of the present invention.
Figure 2:
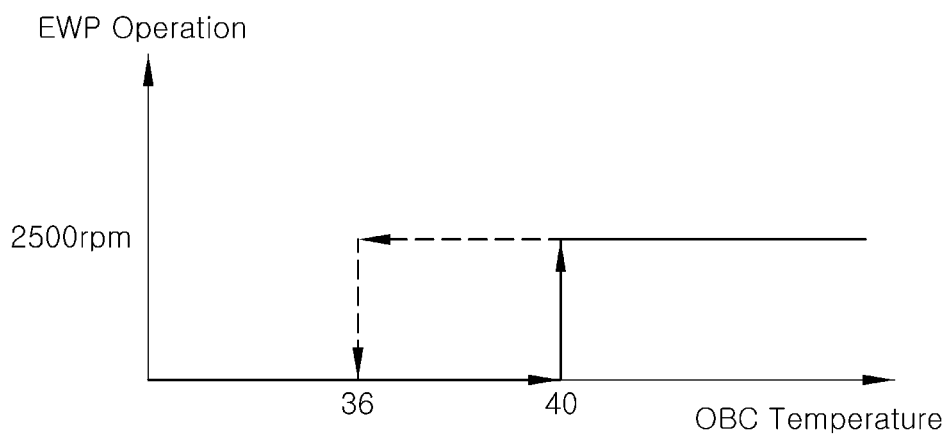
FIGS. 2 to 5 are graphs of the system for charging the plug-in hybrid vehicle shown in FIG. 1.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a system and method for charging a plug-in hybrid vehicle according to exemplary embodiments of the present invention will be described in detail with reference to the accompanying drawings. Throughout the drawings, the same reference numerals will refer to the same or like parts.

Figure 4:
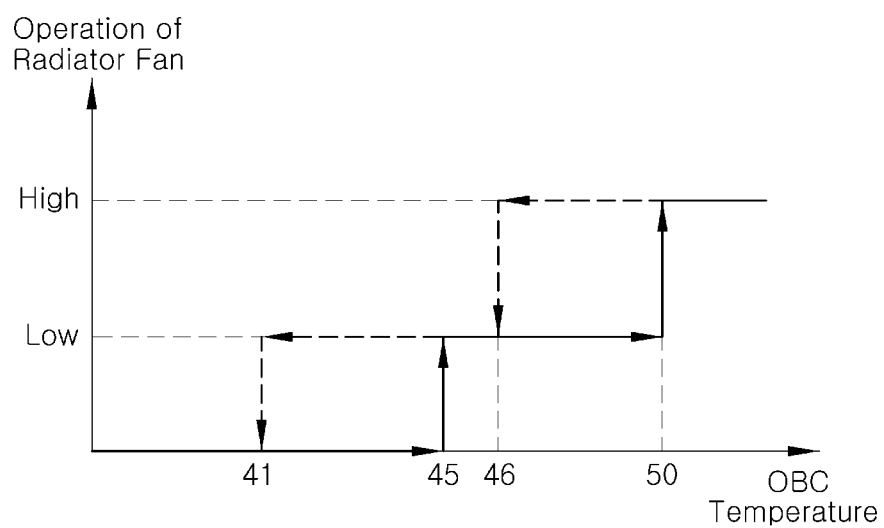
Figure 5:
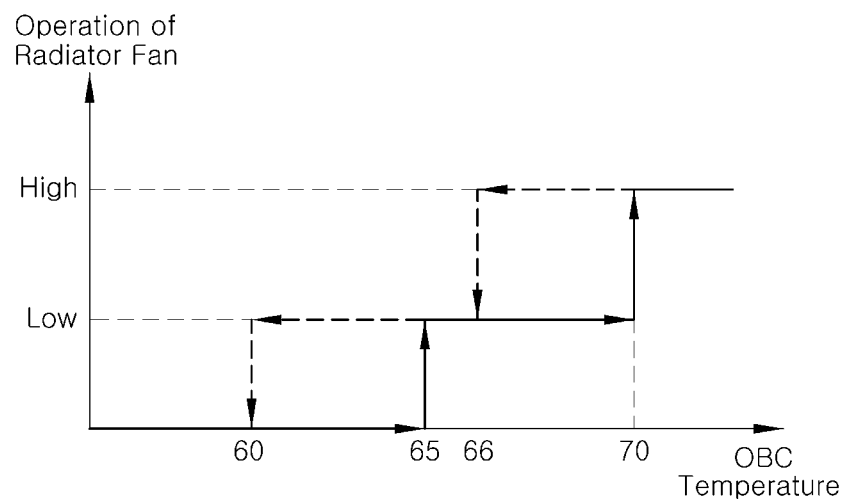
Figure 6:
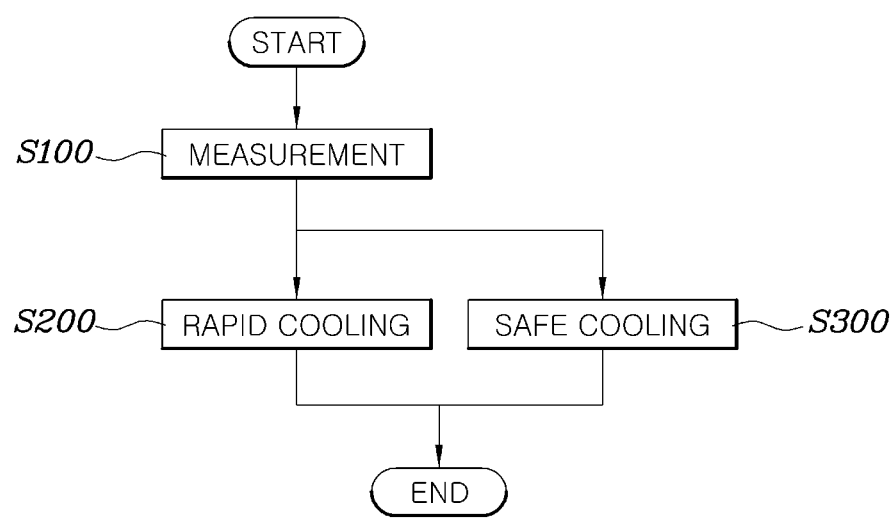
FIG. 6 is a flowchart of a method of charging the plug-in hybrid vehicle according to an exemplary embodiment of the present invention.
Figure 7:
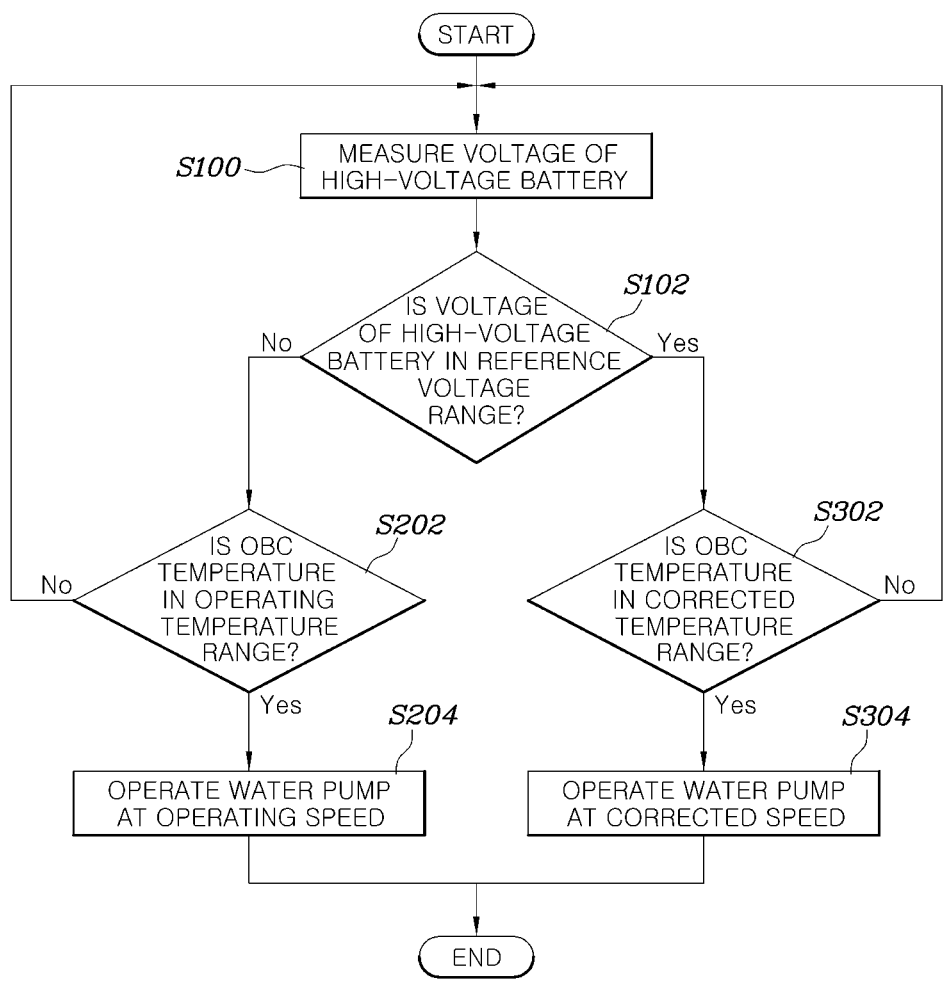
FIGS. 7 and 8 are flowcharts of the method of charging the plug-in hybrid vehicle shown in FIG. 6.
Figure 8:
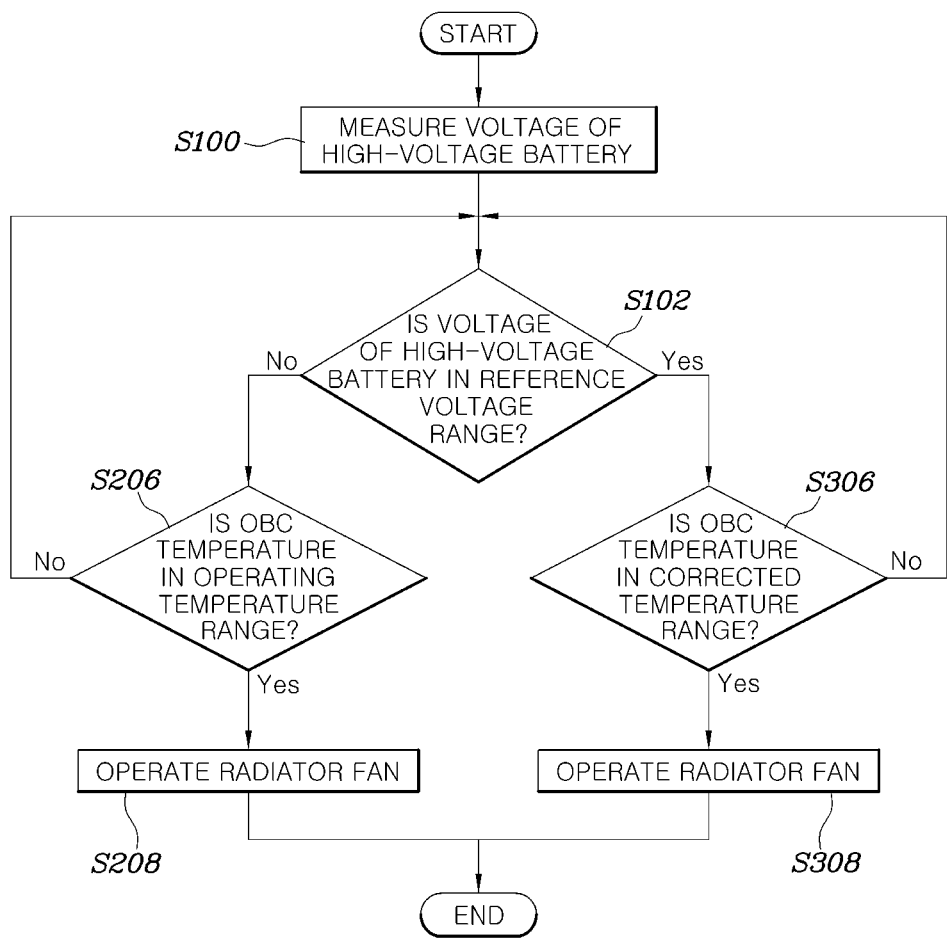

FIG. 1 is a block diagram of a configuration of a system for charging a plug-in hybrid vehicle according to an exemplary embodiment of the present invention, FIGS. 2 to 5 are graphs of the system for charging the plug-in hybrid vehicle shown in FIG. 1, FIG. 6 is a flowchart of a method of charging the plug-in hybrid vehicle according to an exemplary embodiment of the present invention, and FIGS. 7 and 8 are flowcharts of the method of charging the plug-in hybrid vehicle shown in FIG. 6.

As shown in FIG. 1, the charging system for a vehicle such as a plug-in hybrid vehicle according to the present invention includes: a cooler 300 and a controller 400. The cooler 300 cools an on-board charger (OBC) 200 by circulating coolant therethrough, the OBC 200 configured to charge a high-voltage battery 100 of the vehicle. The controller 400 has the voltage information of the high-voltage battery 100 input thereto and a reference voltage range previously stored therein. When the voltage of the high-voltage battery 100 is within the reference voltage range, the controller 400 decreases the frequency of operation and the intensity of cooling of the cooler 300. When the voltage of the high-voltage battery 100 is out of the reference voltage range, the controller 400 increases the frequency of operation and the intensity of cooling of the cooler 300.

The present invention is intended to improve the on-board charging efficiency of a plug-in hybrid vehicle. The frequency of operation and the intensity of cooling of the cooler 300, operating during the charging of the high-voltage battery 100, are adjusted depending on the voltage of the high-voltage battery 100 to improve the efficiency of the charging.

The high-voltage battery 100 is a battery used in an electric vehicle or a hybrid vehicle to store high capacity electric energy. The OBC 200 serves to generate a buffer voltage at a lowest voltage requested by the high-voltage battery 100 and supply the buffer voltage as charging power when high-voltage battery 100 is charged with electric energy. A voltage able to be output by the high-voltage battery 100 is determined depending on the initial design. This voltage is influenced by a state of charge (SOC) and the temperature of the high-voltage battery 100. That is, when the SOC of the high-voltage battery 100 is lower, the voltage able to be normally output may be lower. In contrast, when the SOC of the high-voltage battery 100 is higher, the voltage able to be normally output may be higher. The voltage able to be normally output varies depending on the amount of heat generated by the high-voltage battery 100 and the ambient temperature.

The cooler 300 serves to cool electronic parts of the battery system of the high-voltage battery 100 including the OBC 200. The cooler 300 can cool the OBC 200 using, typically, coolant. In response to the high-voltage battery 100 being charged, the cooler 300 operates to cool the OBC 200. When the cooler 300 operates to cool only the OBC 200 in the same manner as cooling the battery system, an unnecessary amount of power is consumed. Thus, according to the present invention, the operation of the cooler 300 is variably controlled depending on the voltage information of the high-voltage battery 100 to minimize the amount of power consumed by the operation of the cooler 300.

In this regard, the controller 400 has the voltage information of the high-voltage battery 100 input thereto, and has the reference voltage range previously stored therein. When the voltage of the high-voltage battery 100 is within the reference voltage range, the controller 400 increases the frequency of operation and the intensity of cooling of the cooler 300. When the voltage of the high-voltage battery 100 is out of the reference voltage range, the controller 400 decreases the frequency of operation and the intensity of cooling of the cooler 300. The voltage information of the high-voltage battery 100 may be obtained by measuring voltages output by the cells of high-voltage battery 100 or by measuring voltages of the high-voltage battery 100 by reading voltages of a capacitor during switching on/off of a relay in the circuit of the high-voltage battery 100. In addition, the voltage information may be obtained by measuring voltages of the high-voltage battery 100 by a variety of other methods.

The reference voltage range stored in the controller 400 is a range of voltage with which the high-voltage battery 100 is actually charged. In general, the reference voltage range is a range in which a low voltage is output due to insufficient capacity of the high-voltage battery 100 or a range in which the high-voltage battery 100 is completely charged. That is, when the high-voltage battery 100 has obtained a considerable amount of power capacity, a normal voltage is output. Then, during the charging, the amount of heat generated by the OBC 200 is not increased. In contrast, when the capacity of the high-voltage battery 100 is lower, the voltage able to be output is lowered and a necessary amount of charging is also increased, thereby increasing the amount of heat generated by the OBC 200. Thus, the frequency of operation and the intensity of cooling of the cooler 300 must be increased.

Thus, according to the present invention, a voltage output by the high-voltage battery 100 is measured, and the operation of the cooler 300 is controlled in dual modes depending on the voltage output by the high-voltage battery 100 in consideration of the amount of heat generated by the OBC 200 during the charging. Consequently, the temperature of the OBC 200 is adjusted, and power consumed by the operation of the cooler 300 during the charging is minimized, thereby improving the efficiency of charging.

The above-described features of the present invention will be described in detail as follows. The cooler 300 includes a water pump 320 configured to cause a cooling medium to circulate when the OBC 200 is required to be cooled, and a radiator fan 320 configured to adjust the temperature of the cooling medium that circulates to cool the OBC 200. The water pump 320 may be an electronic water pump.

First, a description will be given of control over the water pump 320. When the voltage of the high-voltage battery 100 is lower than the reference voltage range, the controller 400 controls the water pump 320 to operate when the temperature of the OBC 200 has reached a previously-stored operating temperature range. Here, the temperature of the OBC 200 can be measured using a temperature sensor 202.

In contrast, when the voltage of the high-voltage battery 100 is within the reference voltage range, the controller 400 controls the water pump 320 to operate in a corrected temperature range higher than the operating temperature range.

Here, when the voltage of the high-voltage battery 100 is lower than the reference voltage range, an output voltage is lowered due to a small capacity of the high-voltage battery 100, such that a greater amount of electricity must be charged, thereby increasing the amount of heat generated by the OBC 200 during the charging of the high-voltage battery 100. Thus, the operating temperature range is set to increase the frequency of operation of the cooler 300. That is, since the operating temperature range of the OBC 200 in which the OBC 200 continuously or repeatedly operates during the charging of the high-voltage battery 100 is set to a low temperature range, the frequency of operation of the water pump 320 can be increased, thereby continuously cooling the OBC 200 that generates heat during the charging.

In this state, when the high-voltage battery 100 is charged to a predetermined level, the temperature at which the OBC 200 generates heat generated is lowered due to the charging characteristics of the battery. Thus, when the voltage of the high-voltage battery 100 is within the reference voltage range, the controller 400 decreases the frequency of the operation of the water pump 320 by causing the water pump 320 to operate in the corrected temperature range that is higher than the operating temperature range. That is, since the corrected temperature range is corrected to be higher than the operating temperature range, the water pump 320 operates when the temperature of the OBC 200 has reached the higher corrected temperature range, thereby decreasing the frequency of the operation of the water pump 320. In addition, when the voltage of the high-voltage battery 100 is within the reference voltage range, the controller 400 causes the water pump 320 to operate in the corrected temperature range. This can consequently minimize the amount of power consumed by the water pump 320 unnecessarily continuously operating, thereby improving the efficiency of charging.

In addition, when the voltage of the high-voltage battery 100 is lower than the reference voltage range, the controller 400 controls the water pump 320 to operate at a previously-stored operating speed.

Furthermore, when the voltage of the high-voltage battery 100 is within the reference voltage range, the controller 400 controls the water pump 320 to operate at a corrected speed slower than the operating speed.

Here, when the voltage of the high-voltage battery 100 is lower than the reference voltage range, the high-voltage battery 100 is charged with a larger amount of electricity, thereby increasing the amount of heat generated by the OBC 200. Thus, the cooling speed of the water pump 320 must be increased. Consequently, the controller 400 increases the intensity of the operation of the water pump 320, such that the water pump 320 operates at higher revolutions per minute (rpm), thereby ensuring that a greater amount of cooling medium circulates to the OBC 200.

In this state, when the high-voltage battery 100 is charged in a suitable level, the temperature at which the OBC 200 generates heat is lowered. Thus, when the voltage of the high-voltage battery 100 is within the reference voltage range, the controller 400 controls the water pump 320 to operate at a corrected speed slower than the operating speed, thereby decreasing the cooling speed. That is, the corrected speed is a command value by which the water pump 320 operates at a slower speed than the operating speed. The controller 400 causes the water pump 320 to operate at the corrected speed when the voltage of the high-voltage battery 100 is within the reference voltage range. This consequently reduces the amount of power consumed due to the excessive operation of the water pump 320, thereby improving the efficiency of charging.

Hereinafter, an exemplary operation of the water pump 320 will be described with reference to the drawings. When the voltage of the high-voltage battery 100 has not reached the reference voltage range, the controller 400 causes the water pump 320 to operate at 2500 rpm, i.e. the operating speed in a previously-stored operating temperature range of 36° C. to 40° C. When the voltage of the high-voltage battery 100 has not reached the reference voltage range as described above, the frequency of operation of the water pump 320 is increased by causing the water pump 320 to continuously operate in a lower temperature range and the intensity of operation of the water pump 320 is increased, such that cooling can be performed sufficiently when the OBC 200 generates heat.

Figure 3:
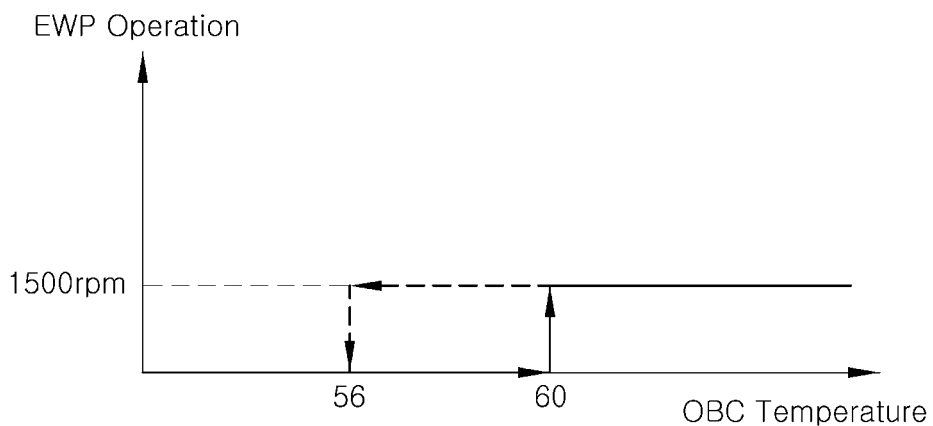

When the voltage of the high-voltage battery 100 has reached the reference voltage range in this state, the water pump 320 is caused to operate at a corrected speed of 1500 rpm in a previously-stored corrected temperature range of 56° C. to 60° C., as shown in FIG. 3. When the voltage of the high-voltage battery 100 has reached the reference voltage range, the frequency of operation of the water pump 320 is reduced by causing the water pump 320 to operate in a higher temperature range and the intensity of operation of the water pump 320 is reduced, such that the OBC 200 is excessively cooled.

This consequently prevents power from being unnecessarily consumed by the operation of the cooler 300 and facilitates the cooling of the OBC 200.

Hereinafter, a description will be given of control over the radiator fan 340. When the voltage of the high-voltage battery 100 is lower than the reference voltage range, the controller 400 controls the radiator fan 340 to operate when the temperature of the OBC 200 has reached a previously-stored operating temperature range.

In contrast, when the voltage of the high-voltage battery 100 is within the reference voltage range, the controller 400 controls the radiator fan 340 to operate in a corrected temperature range higher than the operating temperature range.

The operating temperature range is a temperature range set to increase the frequency of operation of the radiator fan 340, since the amount of heat generated by the OBC 200 increases during the charging of the high-voltage battery 100 when the voltage of the high-voltage battery 100 is lower than the reference voltage range. Specifically, while the high-voltage battery 100 is being charged, the radiator fan 340 continuously operates in the operating temperature range of the OBC 200 that is set to be a lower temperature range. The frequency of operation of the radiator fan 340 is increased to lower the temperature of the cooling medium, such that the OBC 200 that generates heat during the charging can be efficiently performed.

In this state, when the high-voltage battery 100 is charged to a suitable level, the temperature of heat generated by the OBC 200 is lowered. Thus, when the voltage of the high-voltage battery 100 is within the reference voltage range, the controller 400 controls the radiator fan 340 to operate in a corrected temperature range higher than the operating temperature range, thereby lowering the frequency of operation of the radiator fan 340.

Specifically, the corrected temperature range is higher than the operating temperature range. Since the radiator fan 340 operates when the temperature of the OBC 200 has reached the corrected temperature range higher than the operating temperature range, the frequency of operation of the radiator fan 340 is reduced. Thus, when the voltage of the high-voltage battery 100 is within the reference voltage range, the controller 400 controls the radiator fan 340 to operate in the corrected temperature range. This consequently minimizes the amount of power consumed by unnecessary continuous operation of the radiator fan 340, thereby improving the efficiency of charging.

In addition, as the temperature rises in the operating temperature range and the corrected temperature range, the controller 400 controls the intensity of operation of the radiator fan 340 to be increased.

As described above, the controller 400 variably controls the intensity of operation of the radiator fan 340 depending on the temperature of the OBC 200, such that the temperature of the cooling medium is efficiently adjusted depending on the temperature of the OBC 200. Specifically, in a low temperature range in which the temperature of the OBC 200 is preset, the radiator fan 340 is controlled to operate at a previously-set low level. In a temperature range in which the temperature of the OBC 200 is higher, the radiator fan 340 is controlled to operate at a higher level. In this manner, the temperature of the cooling medium is adjusted depending on the temperature of the OBC 200, such that the cooling of the OBC 200 is efficiently performed.

Hereinafter, a description will be given of an exemplary operation of the radiator fan 340 with reference to the accompanying drawings. When the voltage of the high-voltage battery 100 has not reached the reference voltage range, the controller 400 controls the radiator fan 340 to operate in a previously-stored operating temperature range of 41° C. to 50° C., as shown in FIG. 4. When the temperature of the OBC 200 is in a range of 41° C. to 45° C., the radiator fan 340 is controlled to operate at a lower power level. When the temperature of the OBC 200 is in a range of 46° C. to 50° C., the radiator fan 340 may be controlled to operate at a higher power level.

As described above, when the voltage of the high-voltage battery 100 has not reached the reference voltage range, the radiator fan 340 is controlled to continuously operate in a low temperature range to increase the frequency of operation. This consequently lowers the temperature of the cooling medium, whereby the OBC 200 is sufficiently cooled.

In this state, when the voltage of the high-voltage battery 100 has reached the reference voltage range, the radiator fan 340 is controlled to operate in a previously-stored temperature range of 60° C. to 70° C., as shown in FIG. 5. As described above, the frequency of operation of the radiator fan 340 is reduced when the voltage of the high-voltage battery 100 has reached the reference voltage range. This consequently prevents power from being unnecessarily consumed by the excessive operation of the radiator fan 340, thereby improving the efficiency of charging.

As shown in FIG. 6, a method of charging a plug-in hybrid vehicle includes: a measuring step S100 of measuring the voltage of a high-voltage battery; a rapid cooling step S200 of increasing the frequency of operation and the intensity of cooling of the cooler 300 when the voltage of the high-voltage battery is out of a previously-stored reference voltage range after the measuring step S100; and a safe cooling step S300 of reducing the frequency of operation and the intensity of cooling of the cooler 300 when the voltage of the high-voltage battery is within the previously-stored reference voltage range after the measuring step S100.

The voltage of the high-voltage battery is measured at the measuring step S100 as described above, and a step S101 of comparing the voltage of the high-voltage battery with the previously-stored reference voltage range is performed. Afterwards, when the voltage of the high-voltage battery is out of the previously-stored reference voltage range, the rapid cooling step S200 is performed. When the voltage of the high-voltage battery is within the previously-stored reference voltage range, the safe cooling step S300 is performed.

Specifically, the cooler 300 includes the water pump 320 configured to cause a cooling medium to circulate when the OBC 200 is required to be cooled and the radiator fan 320 configured to adjust the temperature of the cooling medium that circulates to cool the OBC 200. The rapid cooling step S200 and the safe cooling step S300 are performed such that the operating temperature ranges of the water pump 320 and the radiator fan 340 and the intensities of operation can vary.

In the rapid cooling step S200, when the voltage of the high-voltage battery is lower than the reference voltage range, a step S202 of determining whether or not the temperature of the OBC 200 has reached an operating temperature range set to be lower than a corrected temperature range to be described later is performed. Afterwards, when the temperature of the OBC 200 has reached the previously-stored operating temperature range, a step S204 of controlling the water pump 320 to operate at a previously-stored operating speed is performed. Here, the operating speed is set such that the water pump 320 operates at a maximum power level. When the voltage of the high-voltage battery is lower than the reference voltage range, the operating speed is increased together with the frequency of operation of the water pump 320, such that the OBC 200 is sufficiently cooled.

In the safe cooling step S300, when the voltage of the high-voltage battery is within the reference voltage range, a step S302 of determining whether or not the temperature of the OBC 200 has reached a corrected temperature range higher than the operating temperature range is performed. Afterwards, when the temperature of the OBC 200 has reached the corrected temperature range higher than the operating temperature range, a step S304 of operating the water pump 320 at a corrected speed slower than the operating speed is performed. As described above, when the voltage of the high-voltage battery is within the reference voltage range, the amount of heat generated by the OBC 200 is also reduced. The operation of reducing the frequency of operation and the intensity of cooling of the water pump minimizes the amount of power consumed by the unnecessary excessive operation of the water pump, thereby improving the efficiency of charging.

In addition, after the voltage of the high-voltage battery is measured through the measuring step S100 and the step of comparing the voltage of the high-voltage battery with the previously-set reference voltage range, when the voltage of the high-voltage battery is lower than the reference voltage range, a step S206 of determining whether or not the temperature of the OBC has reached the previously-stored operating temperature range is performed in the rapid cooling step S200. Here, when the temperature of the OBC 200 has reached the previously-stored operating temperature range, a step S208 of operating the radiator fan 340 is performed, in which the operating power of the radiator fan is varied depending on the temperature of the OBC.

In the safe cooling step S300, when the voltage of the high-voltage battery is within the reference voltage range, a step S306 of determining whether or not the temperature of the OBC has reached the corrected temperature range higher than the operating temperature range is performed. Through this operation, the radiator fan is controlled to operate when the temperature of the OBC is within the corrected temperature range, and at this time, the operating power of the radiator fan is varied depending on the temperature of the OBC.

According to the system and method for charging a plug-in hybrid vehicle as set forth above, when the OBC is cooled by circulating coolant with increases in the temperature of the OBC during the charging of the battery, the frequency and/or intensity of operation of the cooler 300 is adjusted to improve the efficiency of charging.

That is, the operations of the water pump and the radiator fan are controlled by determining whether the voltage of the high-voltage battery is within or out of the reference voltage range in which the on-board charging of the high-voltage battery is performed. This consequently prevents power from being unnecessarily consumed by to the operation of the cooler, such that the efficiency of charging is improved and the OBC is properly cooled.

Although a preferred embodiment of the present invention has been described for illustrative purposes, those skilled in the art will appreciate that various modifications, additions and substitutions are possible, without departing from the scope and spirit of the present invention as disclosed in the accompanying claims.

What is claimed is:

1. A system for charging a plug-in hybrid vehicle, the system comprising:
   a cooler configured to cool an on-board charger by circulating coolant therethrough, the on-board charger charging a battery of the vehicle, wherein the cooler comprises a radiator fan configured to adjust a temperature of a cooling medium that circulates to cool the on-board charger; and
   a controller having a reference voltage range previously stored therein,
   wherein the controller receives information of a voltage of the battery,
   wherein when the voltage of the battery is within the reference voltage range, the controller decreases a frequency of operation of the cooler that consequently decreases an intensity of the cooler, and when the voltage of the battery is out of the reference voltage range, the controller increases the frequency of operation of the cooler that consequently increases the intensity of the cooler,
   wherein when the voltage of the battery is lower than the reference voltage range, the controller controls the radiator fan to operate when a temperature of the on-board charger has reached an operating temperature range that is previously stored, and
   wherein when the voltage of the battery is within the reference voltage range, the controller controls the radiator fan to operate when the temperature of the on-board charger has reached a corrected temperature range that is previously set as higher than the operating temperature range.

2. The system according to claim 1, wherein the cooler further comprises a water pump configured to cause a cooling medium to circulate when the on-board charger is required to be cooled.

3. The system according to claim 2, wherein when the voltage of the battery is lower than the reference voltage range, the controller controls the water pump to operate when the temperature of the on-board charger has reached the operating temperature range that is previously-stored.

4. The system according to claim 3, wherein when the voltage of the battery is within the reference voltage range, the controller controls the water pump to operate when the temperature of the on-board charger has reached the corrected temperature range that is previously set as higher than the operating temperature range.

5. The system according to claim 2, wherein when the voltage of the battery is lower than the reference voltage range, the controller controls the water pump to operate at an operating speed that is previously stored.

6. The system according to claim 5, wherein when the voltage of the battery is within the reference voltage range, the controller controls the water pump to operate at a corrected speed that is previously set as lower than the operating speed.

7. The system according to claim 1, wherein the controller controls the radiator fan to operate at a higher intensity of operation with increases in temperature in the operating temperature range or in the corrected temperature range.

* * * * *